(12) United States Patent  
Thekkath et al.

(10) Patent No.: US 6,604,159 B1  
(45) Date of Patent: Aug. 5, 2003

(54) DATA RELEASE TO REDUCE LATENCY IN ON-CHIP SYSTEM BUS

(75) Inventors: Radhika Thekkath, Palo Alto, CA (US); G. Michael Uhler, Redwood City, CA (US)

(73) Assignee: MIPS Technologies, Inc.

( * ) Notice: Subject to any disclaimer, the term of this patent is extended or adjusted under 35 U.S.C. 154(b) by 0 days.

(21) Appl. No.: 09/373,093

(22) Filed: Aug. 12, 1999

(51) Int. Cl.[7] ............................................. G06F 13/00
(52) U.S. Cl. ....................................... 710/110; 710/240
(58) Field of Search .................................. 710/113, 107, 710/240, 110, 118; 370/447; 711/147; 712/33

(56) References Cited

U.S. PATENT DOCUMENTS

| | | | |
|---|---|---|---|
| 4,587,609 A | | 5/1986 | Boudreau et al. |
| 4,998,198 A | | 3/1991 | Chan |
| 5,091,846 A | | 2/1992 | Sachs et al. |
| 5,255,378 A | | 10/1993 | Crawford et al. |
| 5,347,647 A | | 9/1994 | Stamm et al. |
| 5,428,753 A | * | 6/1995 | Kondo et al. |
| 5,463,762 A | | 10/1995 | Morrissey |
| 5,504,874 A | | 4/1996 | Galles |
| 5,525,971 A | | 6/1996 | Flynn |
| 5,579,530 A | | 11/1996 | Solomon et al. |
| 5,581,782 A | | 12/1996 | Sarangdhar et al. ........ 395/800 |
| 5,615,404 A | | 3/1997 | Knoll et al. ................ 395/882 |
| 5,696,976 A | | 12/1997 | Nizar et al. ................. 395/739 |
| 5,724,549 A | | 3/1998 | Selgas et al. |
| 5,751,975 A | | 5/1998 | Gillespie et al. ............ 395/306 |
| 5,768,612 A | | 6/1998 | Nelson ........................ 395/800 |
| 5,778,412 A | | 7/1998 | Gafken .......................... 711/5 |
| 5,781,745 A | * | 7/1998 | Ramelson et al. |
| 5,787,486 A | | 7/1998 | Chin et al. |
| 5,796,977 A | | 8/1998 | Sarangdhar .................. 395/406 |
| 5,799,203 A | | 8/1998 | Lee et al. |
| 5,802,560 A | | 9/1998 | Joseph et al. |
| 5,828,865 A | | 10/1998 | Bell ............................ 395/500 |
| 5,832,310 A | | 11/1998 | Morrissey et al. |
| 5,859,986 A | | 1/1999 | Marenin |
| 5,892,978 A | | 4/1999 | Munguia et al. |
| 5,918,072 A | | 6/1999 | Bhattacharya |
| 5,996,036 A | | 11/1999 | Kelly |
| 6,034,542 A | | 3/2000 | Ridgeway |
| 6,035,364 A | * | 3/2000 | Lambrecht et al. |
| 6,044,225 A | | 3/2000 | Spencer et al. |
| 6,085,261 A | | 7/2000 | McIntyre, Jr. et al. |
| 6,122,690 A | | 9/2000 | Nannetti |
| 6,134,481 A | * | 10/2000 | Warren |
| 6,138,176 A | | 10/2000 | McDonald et al. |
| 6,108,734 A | | 11/2000 | Shand |
| 6,173,349 B1 | | 1/2001 | Qureshi et al. |
| 6,185,637 B1 | | 2/2001 | Strongin et al. |
| 6,301,625 B1 | | 10/2001 | McDonald et al. |
| 6,321,284 B1 | * | 11/2001 | Shinohara et al. |

* cited by examiner

Primary Examiner—Gopal C. Ray
(74) Attorney, Agent, or Firm—James W. Huffman (57) ABSTRACT

An on-chip split transaction system bus having separate address and data portions is provided. The system bus contains separate address and data buses for initiating and tracking transactions on either or both of the address or data portions of the bus. The system bus provides communication via a bus interface that includes split transaction tracking and control to establish transaction ID's for each transaction initiated by the bus interface, and to determine whether data appearing on the data portion of the system bus is associated with one of its pending transactions. The bus interface also contains a data release mechanism to reduce turn around time of the data bus between competing data bus masters. The data release mechanism is incorporated within the bus interface of all data bus masters. A data bus master drives data release during the last cycle of a data transaction. Another data bus masters (awaiting mastership) receives the data release and begin driving the data bus one cycle after seeing data release.

28 Claims, 10 Drawing Sheets

Timing Diagram for Split Transactions

Figure 7
Timing Diagram for Data Release

Figure 8a

| Source-Destination | Signal Name | Description |
|---|---|---|
| General (2 signals) | Bclk | Bus clock |
| | Breset | Bus reset |
| Master-Address Bus Arbiter (9 signals) | MAA_req | A dedicated reqest signal from every Master to the Address arbiter |
| | MAA_lock | When asserted with a request, this implies a request for two consecutive cycles on the address bus, one read and one write address |
| | MAA_slaveid[2:0] | Indicates to the arbiter the id of the target slave for the current request. Needed for pre-grant flow control |
| | MAA_type[1:0] | Indicates whether operation is read or write or neither. Needed for pre-grant flow control<br>00-Read (non-coherent)<br>01-Write (non-coherent)<br>10-Coherent<br>11-None of the above |
| | MAA_pri[1:0] | Two bits of priority that accompanies each request. The arbiter implementation can optionally use none, one, or both bits. When used, the priority levels are as follows:<br>00-level 1 (lowest priority)<br>01-level 2<br>10-level 3<br>11-level 4 (highest priority) |
| Slave-Address Bus Arbiter and Masters (2 signals per slave) | SAAM_rcredit | Read address credit signal from the Slave to the Address Bus Arbiter and all Masters, one per slave |
| | SAAM_wcredit | Write address credit signal from the Slave to the Address Bus Arbiter and all Masters, one per slave |
| Address Bus Arbiter - Master (1 signal) | AAM_gnt | The grant signal going from the arbiter to every Master |

Figure 8b

| Source-Destination | Signal Name | Description |
|---|---|---|
| Master-Data Bus Arbiter (3 signals) | MDA_req | Request signal from each Master to the data bus arbiter |
| | MDA_pri[1:0] | Two bits of priority that accompanies each request. The arbiter implementation can optionally use none, one, or both bits |
| Slave-Data Bus Arbiter (3 signals) | SDA_req | Slave request line to the data bus arbiter |
| | SDA_pri[1:0] | Priority of a Slave's request to the data bus arbiter |
| Data Bus Arbiter-Master (1 signal) | DAM_gnt | Grant signal going from the data bus arbiter to each Master. |
| Data Bus Arbiter-Slave (1 signal) | DAS_gnt | Grant signal to each slave |
| Address Bus (61 signals for a 32-bit data bus, 65 signals for a 64-bit data bus, 74 for a 128-bit data bus) | AB_addr[33:0] | The 34 bits of address |
| | AB_slaveid[2:0] | Whether this is explicitly needed depends on the decision to implement memory-mapped bus id's. |
| | AB_trid[7:0] | Three bits of Master id and 5 bits of transaction id used to uniquely identify 32 transactions from each Master |
| | AB_cmd[4:0] | The transaction type. e.g., coherent/non-coherent; exclusive/non-exclusive; read/write; data transfer/probe |
| | AB_priority[1:0] | The same priority sent to the address bus arbiter when requesting the bus for a read operation. These bits are ignored by the receiving slave on a write address operation |
| | AB_bytemask[3:0] or AB_bytemask[7:0] or AB_bytemask[15:0] | One bit per byte of data on the data bus. A lest than bus width transaction must be masked because bytemask implies lower address bits. When all the bits are 0, this implies a full bus width transaction. When any of the bytemask bits are 1, the zero bits indicate the position and size of the data associated with the transaction. When streaming data, the size and position of data per cycle is restricted to a few limited number of possible bytemasks: the full width of the bus, the lower 32 bits, or the lower 64 bits. |
| | AB_valid | A one-bit signal on the bus to indicate that the bus is being actively driven on a particular cycle or not |
| | AB_size[3:0] | specifies the size of the transaction, or burst size from 1-16 cycles, with values from 0-15 |

*Figure 8c*

| Source-Destination | Signal Name | Description |
|---|---|---|
| Data Bus (47 signals for a 32 bit bus, 79 signals for a 64 bit bus, or 151 signals for a 128 bit bus) | DB_data[31:0] or DB_data [63:0] or DB_data{127:0] | The implementation allows a 32-bit, 64-bit or 128-bit wide data bus |
| | DB_trid[7:0] | The id of the transaction (returned by the Slave for a read data return) |
| | DB_order[3:0] | Specifies the order of data in the total 16 cycle count. This would be most commonly used to return critical data first for a cache line read |
| | DB_release | Used by a master on the bus to indicate that the bus has been released |
| | DB_endian | The endian-ness of the data on the bus. 0-little endian, 1-big endian |
| | DB_valid | A single bit signal on the bus to indicate that the bus is being actively drive on a particular cycle or not |
| Slaves (with caches) to the Memory Controller (7*2=14 signals, one per slave device) | COH_cstate[1:0] | The state of the cache line for the requested address 00-don't know yet 01-invalid 10-clean 11-dirty |
| Memory Controller to all Masters (1 signal) | COH_credit | When asserted, credits the coherency credit counters in all masters by one |

DATA RELEASE TO REDUCE LATENCY IN ON-CHIP SYSTEM BUS

CROSS REFERENCE TO RELATED APPLICATIONS

This application is related to the following U.S. Patent applications, having a common filing date and a common assignee. Each of these applications are hereby incorporated by reference:

| Ser. No. | Title |
| --- | --- |
| 09/373091 | SCALABLE ON-CHIP SYSTEM BUS |
| 09/373092 | LOCKED READ/WRITE ON SEPARATE ADDRESS/DATA BUS USING WRITE BARRIER |
| 09/373094 | COHERENT DATA APPARATUS FOR AN ON-CHIP SPLIT TRANSACTION SYSTEM BUS |
| 09/373095, now U.S. Pat. No. 6,393,500 | BURST-CONFIGURABLE DATA BUS |

FIELD OF THE INVENTION

This invention relates in general to the field of computer architecture, and more specifically to a data release methodology for an on-chip system bus that reduces turn around latency on a data bus having multiple master devices.

BACKGROUND OF THE INVENTION

A system bus in a computing system provides a communication channel between computing devices, such as microprocessors, graphics processors, direct-memory-access (DMA) controllers, and other devices such as memory, keyboard, monitor, video controllers, sound generation devices, etc. The system bus typically includes data paths for memory addresses, data, and control information. In some instances, a processor multiplexes (i.e., shares) address and data information over the same signal lines, albeit at different times. That is, a processor sends address information out over the address/data pins during a first time period and later uses the same address/data pins to send or receive data. Alternatively, many processors utilize separate signal lines for address and data information.

In operation, processors communicate with memory when they need to fetch instructions. During execution of instructions, processors might be required to read data from memory, or from another device such as an input/output (I/O) port. And, upon completion of instructions, processors might be required to write data to memory, or to another device. A typical scenario for accessing memory to obtain instructions and data is similar to the following:

1. A processor presents a memory address for an instruction on address lines of a system bus, and provides control information on control lines of the system bus to indicate that the operation is a read.
2. In response to the address and control information being placed on the system bus, memory places an instruction on data lines of the system bus, which are then read by the processor. The data is typically placed on the data lines N cycles after the address information has been placed on the address lines, where N is a positive integer and varies depending on the speed of the memory.
3. During execution of the instruction, if data is required, a memory address for the data is placed on the address lines of the system bus, and control information is placed on the control lines of the system bus to indicate a read.
4. Again, the memory places data corresponding to the memory address on the data lines of the system bus.
5. If the instruction needs to write to memory, the memory address for the write is placed on the address lines of the system bus, and control information is placed on the control lines to indicate a write.
6. N cycles after the memory address is presented, the data to be written is placed by the microprocessor on the data lines of the system bus. The memory uses the memory address presented in step 5, and places the data on the data lines into memory at that address.

One skilled in the art will appreciate from the above that the system bus provides the necessary physical interface between a processing device, and other devices (such as memory) that are external to it. A system bus is accompanied by a protocol necessary for communicating between devices. That is, the protocol defines when address, data, and control signals must appear on the system bus, in relation to each other. For example, in the illustration presented above, address information appears in parallel with control information. At some time later, data information is presented by the processor, or is provided by memory.

In environments where there is only one device capable of initiating bus activity (a uni-master environment), the above described sequence is generally sufficient. However, in environments where multiple processors compete for access to shared devices, arbitration is needed to assign time on the bus to the multiple processors.

For example, if there are two processors on a system bus, both competing for access to slave devices (such as memory), typical systems provide an arbitration protocol between the devices to establish which one has the right to begin. On the Pentium bus (designed by Intel Corporation), a processor requests access to the bus by asserting a "bus request" signal. If the processor receives a "grant" signal, either from another processor, or from an external arbitration device, then it begins a transaction by placing address and control information on the bus. When it receives (or writes) data on the bus, it relinquishes control of the bus to the next processor. If another processor required access to the bus during the transaction, it would have to wait until the entire transaction (including the address and data portions of the transaction) completed. In most situations, it is undesirable to deny a processor access to a bus pending completion of an entire transaction by another processor.

One solution to this problem has been to separate the address and data bus portions of the system bus, and to provide separate arbitration for gaining access to each of the buses. For example, rather than requesting access (or master) of the system bus, a first processor may request access to the address bus. If the address bus is available, the first processor can present address information on the address lines, even though a second processor is bus master of the data bus. Access to the data bus by the first processor operates in a similar fashion.

Thus, by separating arbitration for accessing the address bus from that of the data bus, multiple masters are allowed to utilize portions of the system bus simultaneously. An example of an environment that provides for such split address and data buses is the system bus for the PowerPC 603, manufactured by Motorola.

When the address and data portions of a bus are separate, and are shared by multiple bus masters, a system is required to allow master devices to request, and gain access to the address and data buses, independently. This is typically provided via an arbiter, and an arbitration protocol.

The arbiter is coupled to each device on the bus that can act as a master device. A master that wishes to access either the address or data portions of the system bus presents a bus request (address bus request, or data bus request) to the arbiter. The arbiter, upon receipt of a request, utilizes its predefined protocol to determine when to grant the master access to either of the address or data bus. When it determines that the requesting master can access the address bus or the data bus, it provides that master with a bus grant signal (pertaining to the requested bus). Upon receipt of the grant signal, the requesting master begins driving the bus (address or data).

In some instances, master devices drive the data bus for a period of time that is unknown to the arbiter. That is, when the arbiter grants a master device access to the data bus, the arbiter does not know how long the master device will drive the bus. The master device may require only a single cycle to perform its data transfer. Alternatively, the master device may be performing an extensive transfer operation, and may require the data bus for a number of cycles, (e.g., 16 cycles). Since the arbiter does not know how long a master device will drive the data bus, it is unable to grant access to another requesting master until it knows that the data bus is released.

In multiple master environments, where master devices drive the data bus for an indeterminate period of time, a "data release" signal was developed to indicate when the current bus master has released the data bus. That is, the a data release signal is driven by the current master when it relinquishes control of the data bus. When the arbiter sees the data release signal, it grants access to the next requesting bus master.

A problem that exists with the present data release methodology is that arbiters typically do not grant mastership of the data bus to a requesting bus master until after the data release signal is driven (by the current master device). When this is the case, there is usually a delay between the time the current master device releases the data bus, and the time the next bus master device is granted mastership, and begins driving data. This delay, or latency, associated with turning mastership of the data bus over from one master to another, is often several cycles long. One skilled in the art will appreciate that any delay in granting a requesting master access to the data bus is undesirable.

Therefore, what is needed is a data release methodology that reduces the latency typically associated with turning mastership of the data bus over between multiple master devices.

Furthermore, what is needed is an on-chip system bus that incorporates a data release methodology to optimize data bus bandwidth within a multi-master environment.

SUMMARY

The present invention provides an innovative on-chip system bus having a bus arbiter, and a plurality of data master devices that perform data transfers. Each of the master devices includes a bus interface and data release drive and control. The bus interface allows its associated master device to communicate on the system bus. The data release drive and control, is coupled to the bus interface, to receive a data bus grant signal from the bus arbiter, and to generate a data release signal to the system bus during the last cycle of the data transfers. In addition, the data release drive and control monitors the data release signal from other devices and latches it to determine whether its master device can begin driving data onto the data bus. By separating the bus grant signal from the bus release signal, by allowing the bus grant signal to be provided to the next bus master, and by overlapping generation of the bus release signal with the last cycle of the data transfer, latency between the current bus master and the next bus master is reduced.

In another aspect, the present invention allows a master that has asserted release on the last cycle of a previous transaction to begin re-using the data bus if it still has a grant signal. In this case all other masters that latched the release signal resets it when they see a re-use of the data bus.

In another aspect, the present invention provides a processing device configured to access an on-chip bus to perform a data transfer. The access is initiated when the processing device generates a data bus request signal to a bus arbiter. The processing device includes a bus interface, for coupling the processing device to the on-chip bus, and data release drive and control logic. The drive and control logic is coupled to the bus interface, and presents a data release signal to the on-chip bus during the last cycle of the data transfer. In addition, the bus arbiter generates a data bus grant signal to the processing device, if a data portion of the on-chip bus is available. Also, the bus arbiter generates a data bus grant signal to the processing device, if a data portion of the on-chip bus is not available, but will become available when released by a current data bus master.

In yet another aspect, the present invention provides computer program product for use with a computing device. The computer program product includes a computer usable medium having computer readable program code embodied in said medium for causing an on-chip computing bus to be developed. The computer readable program code includes first computer readable program code to provide a bus interface, for coupling a processing device to the on-chip computing bus, and second computer readable program code to provide data release drive and control logic that is coupled to the bus interface, that presents a data release signal to the on-chip computing bus during the last cycle of a data transfer.

An additional feature of the present invention provides a method for granting access to a data bus within an on-chip multi-master environment. The method includes: when the data bus is being accessed by a first master device, providing a data bus grant signal to a second master device; before the first master device relinquishes access to the data bus, driving a data bus release signal to the second master device; and accessing the data bus by the second master device, after it receives the data bus release signal.

Other features and advantages of the present invention will become apparent upon study of the remaining portions of the specification and drawings.

BRIEF DESCRIPTION OF THE DRAWINGS

FIGS. 8a–c show a table illustrating the address, data and control lines of the system bus according to the present invention.

DETAILED DESCRIPTION

The above background provided an overview of system buses, and described the delay associated with turning mastership of a data bus over to competing master devices. The discussion below provides a more detailed overview of a related art system bus, in FIGS. 1 and 2, so that the reader will better understand the novel features of the present invention described with reference to FIGS. 3–11.

Figure 1:
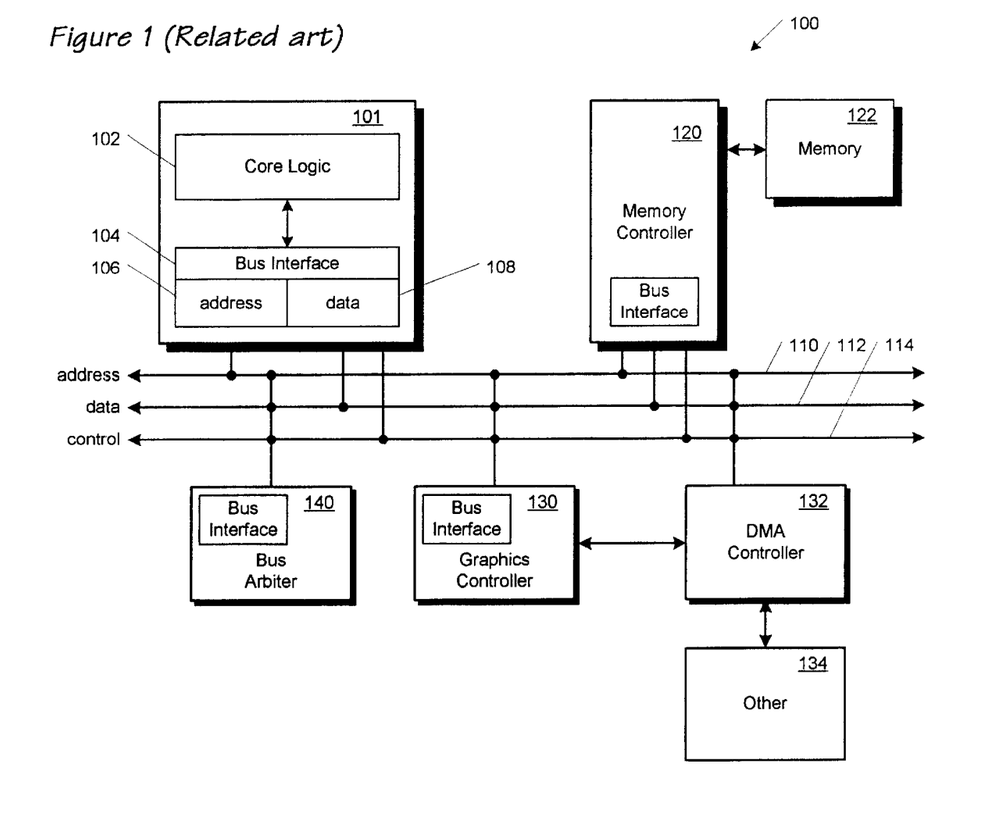
FIG. 1 is a block diagram of a related art multi-processing environment illustrating a processor connected through a bus interface to a memory controller, and other devices.

Referring to FIG. 1, a block diagram 100 of a related art computer system is shown. The computer system 100 includes a microprocessor 101 coupled to a memory 122 via a memory controller 120, via a system bus having separate address lines 110, data lines 112, and control lines 114. Also coupled to the system bus is a graphics controller 130, and a DMA controller 132, the DMA controller 132 coupling other device(s) 134 to the system bus. Finally, a bus arbiter 140 is. shown, coupled to the system bus, to arbitrate access to both the address bus 110, and the data bus 112, between the competing bus master devices 101, 120, 130 and 132.

One skilled in the art will appreciate that the system bus of FIG. 1 may be either an on-chip or off-chip system bus depending on the solution required. In addition, the system bus as shown presents each device coupled directly to each of the address/data/control buses 110, 112, 114. The illustration of FIG. 1 is exemplary only. One skilled in the art understands that the separate buses 110, 112, 114 may connect to distinct devices, in a point-to-point fashion. The structure of the system bus in FIG. 1 simply provides a convenient illustration of how distinct devices communicate with one another over address/data/control lines.

Within the microprocessor 101 is a bus interface 104 with separate address 106 and data 108 portions, for interfacing the microprocessor 101 to the address and data lines 110, 112 of the system bus. The bus interface 104 is coupled to core logic 102 for executing instructions retrieved by the microprocessor 101.

In operation, when the microprocessor 101 wishes to communicate with an external device, such as the memory 120, or the I/O 132, the bus interface 104 is required to perform a bus cycle using the address, data, and control lines 110–114. During a bus cycle, the microprocessor 101 places an address corresponding to the target memory (or I/O) address on the address lines 110. In addition, the microprocessor 101 indicates the type of bus cycle it is initiating by placing a pattern on the control lines 114. Exemplary bus cycle types include reads and writes to memory or I/O. If the bus cycle type is a read, then N cycles after the memory 120 sees the target address on the address lines 110, and notices the bus cycle type from the control lines 114, the memory 120 will place the data stored at the target address on the data lines 112. The data portion 108 of the bus interface 104 will see the data on the data lines 112 and will latch the data for use by the core logic 102.

However, in a multi-master environment, where the address and data portions of a bus cycle are split, the processor 101 must first gain access to the address bus 110 by asserting "address bus request" to the arbiter 140. When the bus arbiter 140 asserts "address bus grant" to the processor 101, the processor 101 can drive the address onto the address bus 110 (and the control information onto the control bus 114). At some later time, the memory controller 120 provides the data associated with the request on the data bus 112. However, before the memory controller can begin driving the data, it must obtain mastership of the data bus. It does so by asserting "data bus request" to the arbiter 140. When the arbiter 140 asserts "data bus grant", the memory controller 120 can begin driving the data.

Figure 2:
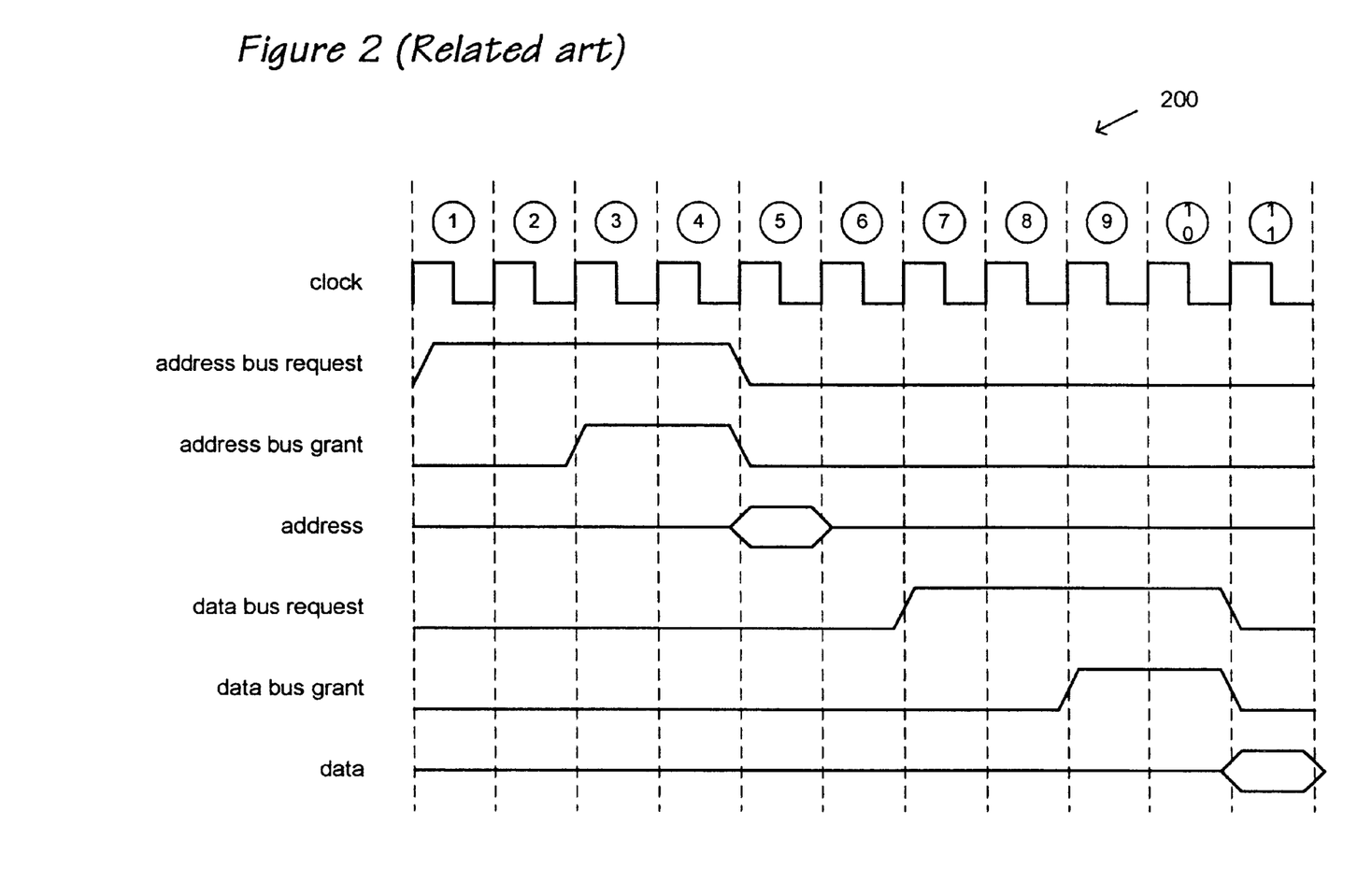
FIG. 2 is related art timing diagram illustrating a memory read cycle through the bus interface of FIG. 1.

This is particularly illustrated in FIG. 2 to which attention is now directed. FIG. 2 provides a timing diagram 200 that illustrates a memory read bus cycle for the computing system 100 described above. A clock signal is shown that is the clock for the system bus. Addresses on address lines 110 are shown as an address signal. Data on data lines 112 are shown as a data signal.

In performing a memory read, the processor 101 asserts an address bus request during clock cycle 1. At clock cycle 2, the bus arbiter 140 sees the address bus request, and since the address bus is not currently busy, it asserts address bus grant at clock cycle 3. The processor 101 sees that the arbiter 140 has granted it mastership of the address bus 110 in clock cycle 4, and so, in clock cycle 5, drives the address associated with the bus cycle onto the address bus 110. The memory controller 120 sees the memory read in clock cycle 6, obtains the requested data, and asserts data bus request in clock cycle 7. The bus arbiter 140 sees the data bus request at clock cycle 8, and since the data bus is not currently busy, it asserts data bus grant in clock cycle 9. The memory controller 120 sees the data bus grant in clock cycle 10, and drives data onto the data bus 112 during clock cycle 11. The processor 101 sees the data on the data bus 112 and latches it into the data portion 108 of the bus interface 104. This completes the read bus cycle for the processor 101.

What should be apparent from the timing diagram 200 is that 2 clock cycles are required from the time the processor 101 requests mastership of the address bus 110, and the time the arbiter 140 asserts address bus grant. And, two cycles are required from the time the memory controller 120 asserts data bus request, and the time the arbiter asserts data bus grant. Moreover, there is a 2 cycle latency between the time a master device (either the processor 101 on the address bus 110, or the memory controller 120 on the data bus 112) is granted access to a bus, and the time it begins driving the data. One skilled in the art will appreciate that the delays associated with a master device requesting access to a bus, and finally recognizing it has been granted mastership, is highly undesirable. What will now be described with reference to FIGS. 3–13 is a data release mechanism within an on-chip bus directed at overcoming the delays described above.

Overview of the MOS Bus

The discussion below describes novel aspects of the resent invention as embodied within a product developed by MIPS Technologies, Inc., and called internally the MIPS On-Chip System (MOS) Bus. The MOS Bus is being developed as a scalable split-transaction bus for interfacing multiple masters in an on-chip environment.

The MOS Bus provides a synchronous interface to a de-multiplexed split transaction bus, having a 36-bit address bus, 4 to 16 bits of byte mask depending on the size of the data bus, and either a 32, 64 or 128-bit data bus. The arbitration for the address and data buses is independent, with the arbiter being central (one per bus). The arbiter considers all the incoming bus requests and decides a winner based upon the implemented algorithm. In the simplest instance, the arbiter does round robin scheduling of all the requesting masters. The complexity of the arbitration algorithm can vary depending on the performance requirements of the system. The buses and arbiter logic are pipelined, so the arbiter can be granting the bus to the next requester, while the previous winner is using the bus.

The data portion of the MOS bus supports burst transactions for devices with bursting traffic or higher bandwidth requirements. The address bus inherently only supports single cycle transactions, with the exception of locked read-modify-write operations. The protocol also allows the last-use master to park on the bus, for both buses, while there are no other requesters.

Although the description below will illustrate a particular embodiment of the MOS Bus, one skilled in the art will appreciate that the novel aspects of the present invention are applicable to other bus designs, and should not be restricted to the particular embodiment described.

Figure 3:
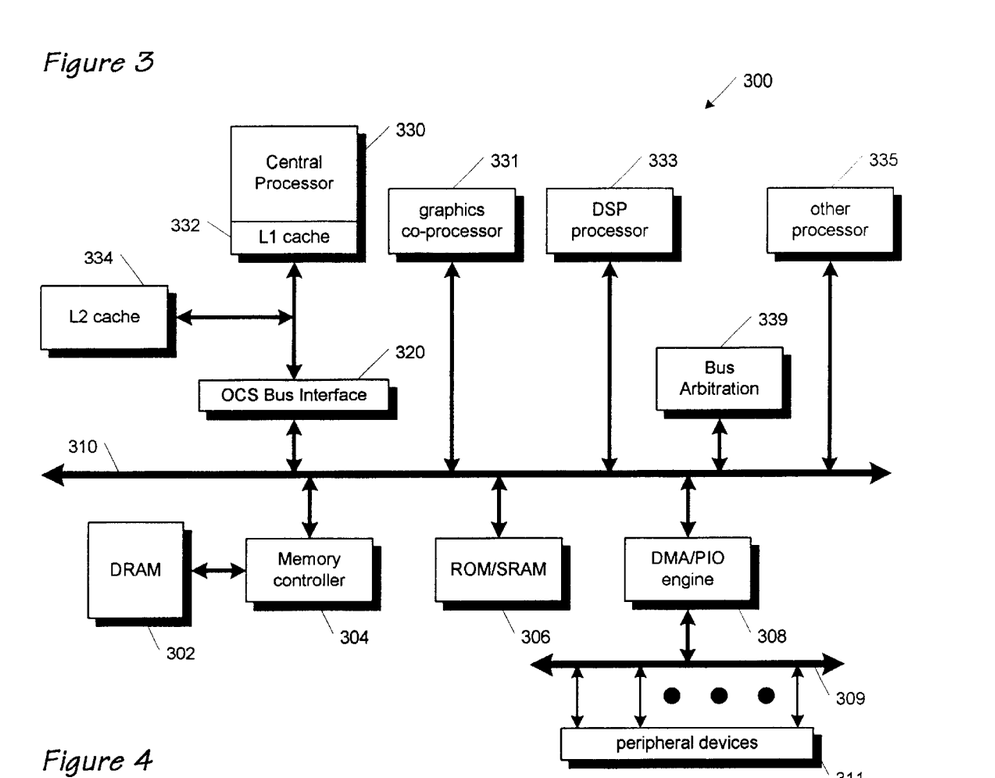
FIG. 3 is a block diagram of an on-chip system bus according to the present invention, particularly illustrating a multiple master/slave environment.

Referring to FIG. 3, a block diagram 300 is provided illustrating a number of on-chip processing devices in communication with each other via a system bus 310. More specifically, a central processor 330 (having an L1 cache 332) is coupled to the system bus 310 via a bus interface 320. Between the bus interface 320 and the central processor 330 is an L2 cache 334. To illustrate that the on-chip system bus 310 is a multi-master bus, other master devices are shown including: a graphics co-processor 331, a DSP processor 333, and an other processor 335. Furthermore, a number of slave devices are shown attached to the system bus 310 including: DRAM 302 attached via a memory controller 304; ROM/SRAM 306; and a direct memory access (DMA)/programmable input output (PIO) engine 308 for coupling peripheral I/O devices 311 to the system bus 310 via a peripheral bus 309.

Operationally, any of the master devices 330, 331, 333, 335 can communicate with the memory controller 304, ROM/SRAM 306 or the DMA/PIO engine 308 via the system bus 310, albeit at different times. In addition, the master devices 330, 331, 333, and 335 may have resources within them that may be accessed by the other master devices. That is, a device may be a master device for some transactions and a slave device for other transactions.

Finally, coupled to the system bus 310 is bus arbitration logic 339. The bus arbitration logic is responsible for receiving bus master requests for either the address bus or the data bus, and for providing bus grant signals to the requesters according to a predetermined arbitration algorithm. The protocol for requesting mastership of the address and data buses will be further described below. First however, a detailed description will be provided for the split-transaction logic that is embodied within the on-chip MOS bus, according to the present invention, so that the reader will better understand the novelty of the data release mechanism described below with reference to FIGS. 6–7.

Split Transactions

The computing environment described above in FIG. 1 required the processor 101 to wait until the data portion of the bus cycle completed before it was allowed to issue another read request. To eliminate this wait, the system bus 310 of the present invention provides a split transaction bus. That is, the master devices do not have to wait for a request to be completed before issuing a new request. Rather, the masters, on the address/control lines of the system bus 310, are allowed to make requests before the data portions associated with their requests complete. In addition, the masters receive and process requests even when they are waiting on completion of prior requests. This is accomplished by separating the request and the reply portions of transactions. By de-coupling the request portion of a transaction, from the reply portion of the transaction, latencies typically associated with waiting on the reply portion to complete are eliminated.

However, since multiple requests can be pending on the system bus 310 at any one time, a means is required to identify data replies back to their corresponding requests, if out-of-order returns are to be permitted. To satisfy this requirement a master tags each request that is made on the system bus 310 when it issues. When a data response is ready, a slave device sends the tag back to the requesting master with the data. For Write requests, the writing master sends the written data with the same tag it used when it issued the Write control. Furthermore if multiple masters are placed on the system bus 310, a portion of the tag is used to identify the requesting device.

Figure 4:
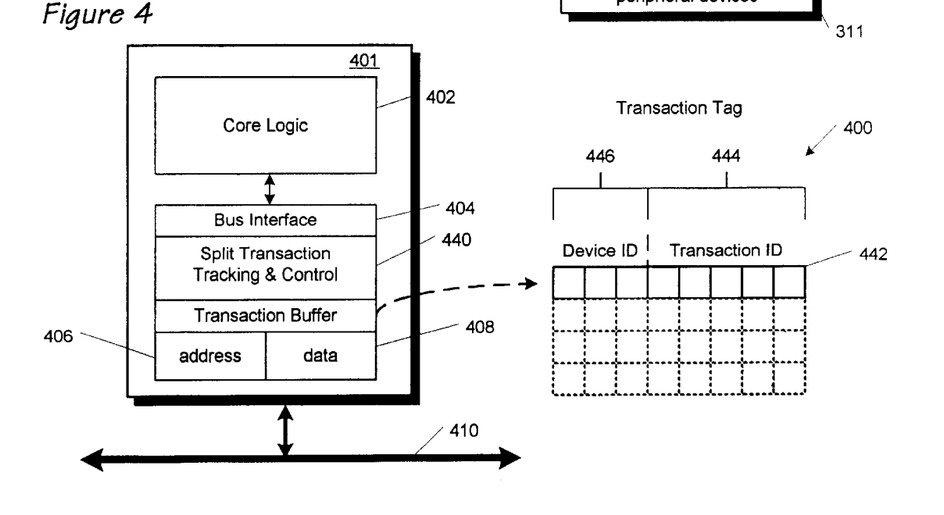
FIG. 4 is a block diagram of a processing device incorporating split transaction tracking and control for interfacing to the on-chip system bus.
Figure 5:
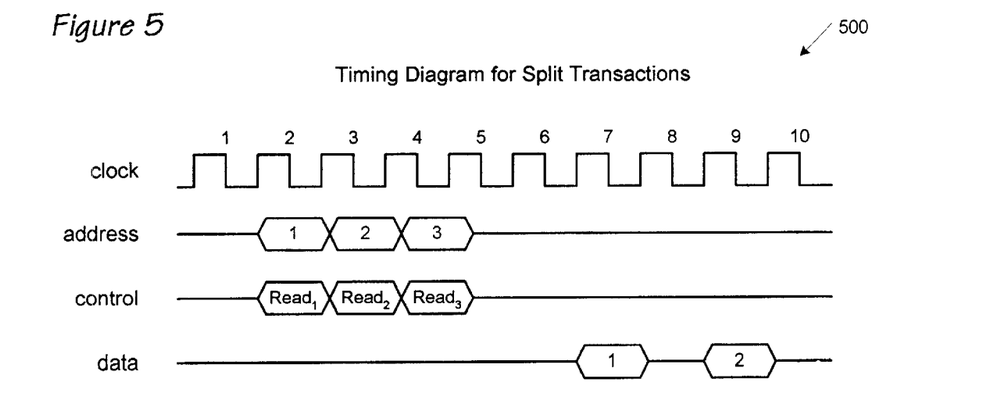
FIG. 5 is a timing diagram illustrating use of the split transaction tracking and control on the on-chip system bus of the present invention.

Access to the address and data portions of the MOS bus are eliminated from the discussion in FIGS. 4 and 5 so that the reader can better understand the function of the split-transaction aspects of the present invention.

Referring to FIG. 4, a block diagram 400 is provided of a microprocessor 401 incorporating aspects of the present invention. Elements similar to those described in FIG. 1 above are shown with the same reference numbers, the hundreds digit being replaced with a 4.

Additionally, the processor 401 includes split transaction tracking & control 440 coupled to the core logic 402 and the bus interface 404. In one environment, the split transaction tracking and control 440 is embodied within the bus interface 404 within the processor 401, although this is not a requirement. Within the split transaction logic 440 is at least one transaction buffer 442. The buffer 442 provides temporary storage for transactions awaiting response. The transaction ids are 8- bits in width, a 5-bit transaction ID 444 and a 3-bit master device ID 446. By using a 5-bit transaction ID 444, as many as 32 outstanding requests may exist on the system bus 410, and hence a transaction buffer of up to 32 entries. In addition, by using a 3-bit master device ID 446, as many as 8 different master devices may be indicated. If an implementation supports all 32 requests, the transaction buffer 442 may be implemented with a 32 gentry table (i.e., one entry per outstanding transaction).

In operation, as each request is made by the processor 401, a target address is placed on address lines of the system bus 410. Note: particular definitions of each of the lines on the system bus 410 are provided below with reference to FIGS. 8a–c.

As part of the request, the split transaction tracking and control 440 provides a transaction ID that is associated with the request. In one embodiment, this id is generated by concatenating the current requester's id with the index of the transaction buffer entry that will hold the request until a response is returned. The transaction ID is then placed on the ID control lines (described further below) of the system bus 410.

When a reply is presented on the data lines of the system bus 410, the transaction ID associated with the request is placed on the data ID lines of the system bus 410. Thus, the device replying to the request must be designed to provide the transaction ID to the system bus 410 along with the data. To better understand how splitting the request and reply portions of a bus cycle reduces the wait described above, attention is directed to FIG. 5.

In FIG. 5, a timing diagram 500 is provided illustrating split transaction requests/replies. During clock cycle 1, request 1 is placed on the control lines of the system bus 410 to indicate a read. In addition, the split transaction tracking & control 440 places a transaction ID of 1, for example, on the ID lines of the system bus 410. At the same time, the address portion 406 of the bus interface 404 places the target address associated with the request on the address lines of the system bus 410. At the end of clock cycle 1, the address and control lines of the system bus 410 are free to perform another transaction. This is true even though the reply associated with request 1 has not completed. Thus, in comparison with FIG. 2, the processor does not have to wait 6–8 cycles before beginning another request. Rather, the processor 401 can immediately make another request, if needed.

As shown in FIG. 5, the processor 401 makes 3 back to back requests. Beginning in clock cycle 2, the processor 401 issues request 2 on the control lines of the system bus 410. In addition, the split transaction tracking & control 440 provides a transaction ID of 2 to the bus interface, which is presented on the ID lines of the system bus 410. At the end of clock cycle 2, the address and control lines are free to perform another request.

So, in clock cycle 3, the processor 401 issues request 3 on the control lines of the system bus 410. The split transaction and control 440 provides a transaction ID of 3 to be presented on the ID lines of the system bus 410. The target address associated with request 3 is also presented on the address lines of the system bus 410. At the end of lock cycle 3, the address and control lines are free to perform another transaction.

During clock cycle 6, data associated with request 1 is placed on the data lines of the system bus 410. The data is being provided by memory external to the processor 401, or by the slave device that is indicated by the device ID lines of the transaction tag. In addition, the transaction ID associated with request 1 is placed on the data ID lines of the system bus 410 to identify the data with its associated transaction. At this point, the bus interface 404 of the processor 401 detects the data, and its associated transaction ID. Since the transaction ID indicates the master device ID, the processor 401 knows that it is the requester. So, the processor 401 latches the data in the data portion 408 of the bus interface 404. The transaction tag is then provided to the split transaction & control 440. The split transaction & control 440 is then responsible for associating the data according to the target address of request 1. At the end of clock cycle 6, the data lines are free to be used by another device on the MOS bus 410.

During clock cycle 8, data associated with request 2 is placed on the data lines of the system bus. Again, along with the data, its associated transaction tag is placed on the ID lines of the system bus. The processor recognizes that it was the requester of the data, and latches the data in the data portion 408 of the bus interface 404. The split transaction & control 440 is then responsible for associating the data according to the target address of request 2.

What has been described above with respect to FIGS. 4 and 5 is a means for separating the request and reply portions of a bus cycle to allow multiple requests to be made, without regard to latencies associated with replies. In the embodiment shown, all of the concurrent requests were memory read requests (as opposed to memory writes, or I/O reads/writes). However, one skilled in the art will appreciate that the nature of the request does not affect the advantages of the split transaction bus. In addition, what has been described are concurrent requests made by a single processor 401. It should also be appreciated that multiple processors can exist on the system bus 410 each having their own device ID.

Address Bus Protocol

When a master wants to use the address bus, it sends a request signal to the address bus arbiter. The arbiter grants the bus based on its arbitration algorithm. The master asserts the lock signal when it wants the address bus for two consecutive cycles (r-w). Besides these, the master's bus interface sends three other pieces of information to the address bus arbiter: the transaction type MAA_type[1:0], the target slave id MAA_slaveid[2:0] of the prospective transaction, and the priority of the transaction MAA_pri [1:0]. Depending on the complexity of the arbiter, it may or may not choose to use this information. The transaction type and slave id would be used by an arbiter in a system that wants to minimize wasted cycles on the bus. That is, the arbiter also maintains a set of credit counters for the slaves, and checks credit status before granting the request from a master targeted to a particular slave for a specific transaction type. With this type of arbitration, the arbiter is designed to prevent starvation and to be fair. For more information on the credit counters used, the reader is directed to U.S. patent Ser. No. 09/373,091, entitled SCALABLE ON-CHIP SYSTEM BUS which is hereby incorporated by reference.

The priority bits are used if the arbiter implements a priority based arbitration algorithm, such as round robin arbitration at different priority levels. The two bits of priority allow the implementation of 4 priority levels. The simplest arbiter could ignore the priority bits and assume that all requests are at the same level and implement a round robin algorithm among all the masters. A more complex arbiter might implement two priority levels and hence ignore one of the two priority bits, and implement round robin among the two levels. That is, as long as there are requests at the higher priority level, they are granted and requests at the lower priority level must wait until there are no requests pending at the higher level. A configuration bit (not shown) in each bus interface specifies the number of priority levels that the arbiter in the current implementation will accept.

The address bus consists of 65 signals (for a 64-bit data bus). These include AB_addr[33:0] for the address. The lower 2 bits of the address are not needed since the data bus width is 8 bytes and byte addresses are used on the bus. One mask bit per data byte provides the data byte mask with an 8-bit byte mask for the 8 data bytes (or 16 bytes wide with 16 bits of bytemask, or 4 bytes wide with 4 bits of bytemask). This system uses 34 bits to address a 36-bit wide address. Other systems may use wider addresses. In such systems, this expanded addressing capability can be accommodated by simply expanding the width of the address lines.

Since the bus architecture supports a maximum of eight drops, three bits AB_slaveid[2:0] are sufficient to address the slave device. The transaction id AB_trid[7:0] consists of 3 bits of master id to uniquely specify the master that originated the transaction, and 5 bits of transaction id, to uniquely track up to 32 outstanding transactions from a specific master.

The AB_bytemask field is used to indicate the position and size of data on the 8 byte wide data bus (assuming a 64-bit data bus, 8 bits of byte mask are required). If all the AB_bytemask bits are zero, this implies a full data bus width transaction. If any of these bits are not zero, then the position and number of the zero bits indicate the position and size of the data in the total width. A transaction is said to stream data when a single address is used to transmit more than one cycle of data on the data bus. When streaming data, not all bytemask values are valid.

Data Bus Protocol

A generator of data (a source) uses the data bus to transmit the data to a sink, who accepts the data. The basic data bus protocol is a little different from the address bus protocol. The main differences are: the explicit use of a release signal by a source to relinquish the data bus (described further below); multi-cycle burst transactions; and no separate flow control for data bus transactions. Rather, the flow control of data bus transactions are implicitly tied to address transactions. A slave configuration register (discussed above in FIG. 7) holds the length of bursts supported by a slave per address transaction for write operations. A master must guarantee buffer space for read-return data from a slave. For a more complete description of the configuration register, please see U.S. Pat. No. 6,393,500, entitled BURST CONFIGURABLE DATA BUS.

The initial steps of the request-grant-data-release protocol sequence works as it did for the address bus. That is, when a source wants to use the bus it asserts a request signal MDA_req to the data bus arbiter. The arbiter grants the request DAM_gnt two cycles or later. Two cycles after the source sees grant, it begins to use the data bus. Once the source obtains the data bus, it can continue to use it until the arbiter takes away grant. After the arbiter takes away grant, the source can continue to hold the data bus until it completes its current transaction. During its last cycle of use of the data bus, the source asserts the release signal DB_release. This implies that the data bus is available for use by another source two cycles after the release signal. The cycle after release is the bus turn around cycle. When other sources are requesting the bus, the arbiter asserts grant for a cycle and deasserts it while asserting it to the next source. The second source cannot use the data bus until it sees the release signal from the current source on the bus. The arbiter needs to keep the grant signal asserted at the second source until the first source releases the bus.

Data Release to Reduce Latency

Figure 6:
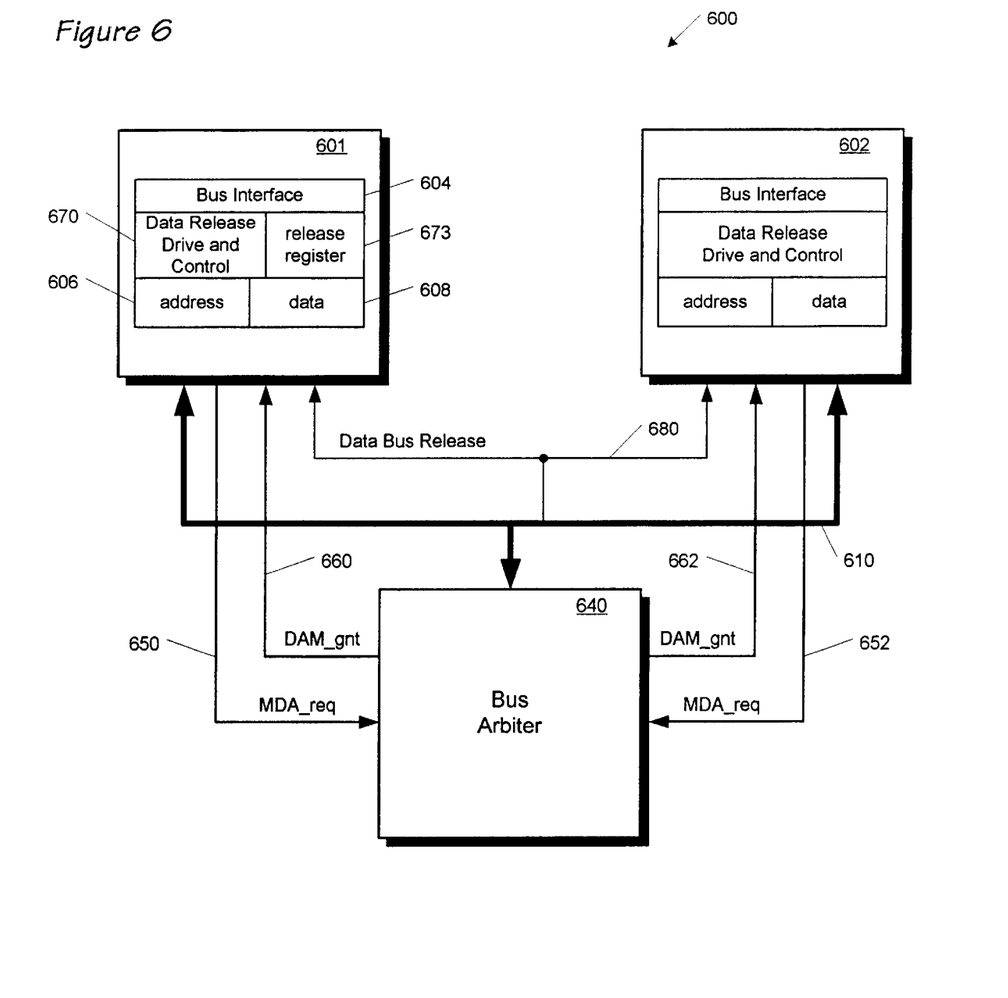
FIG. 6 is a block diagram of a processing device containing a data release mechanism according to the present invention.

Referring to FIG. 6, a block diagram 600 of a data release mechanism according to the present invention is shown. The purpose of the data release mechanism is to reduce the latency typically associated with ending a first data transaction, and beginning a second data transaction. This latency, along with the improved timing of the present invention will be illustrated below with reference to FIG. 7. However, a brief overview of the elements required to reduce the latency will first be described with reference to FIG. 6.

Diagram 600 includes a first data master 601 coupled to a second data master 630 via a system bus 610. Both the first and second data masters 601, 630 are coupled to an arbiter 640 via the system bus 610. Within the master 601 is a bus interface 604 having address and data portions 606, 608 respectively. Also within the master 601 is data release drive and control logic 670 that is coupled within the bus interface 604. The data release drive and control logic 670 communicates with the data master 602 and the bus arbiter 640 via Data Bus Request (MDA_req) lines 650, 652 and Data Bus Grant (DAM_gnt) signal lines 660, 662, respectively. The data release drive and control logic 670 also contains a release register 673 for latching a release signal driven by other data master devices. In addition, each of the data masters 601, 602 provide a data release signal (DB_release) to each other via signal line 680. The data master 602 also contains data release drive and control logic 670, similar to that contained in the data master 601. Operation of the data release drive and control logic 670 will now be described with reference to FIG. 7.

Figure 7:
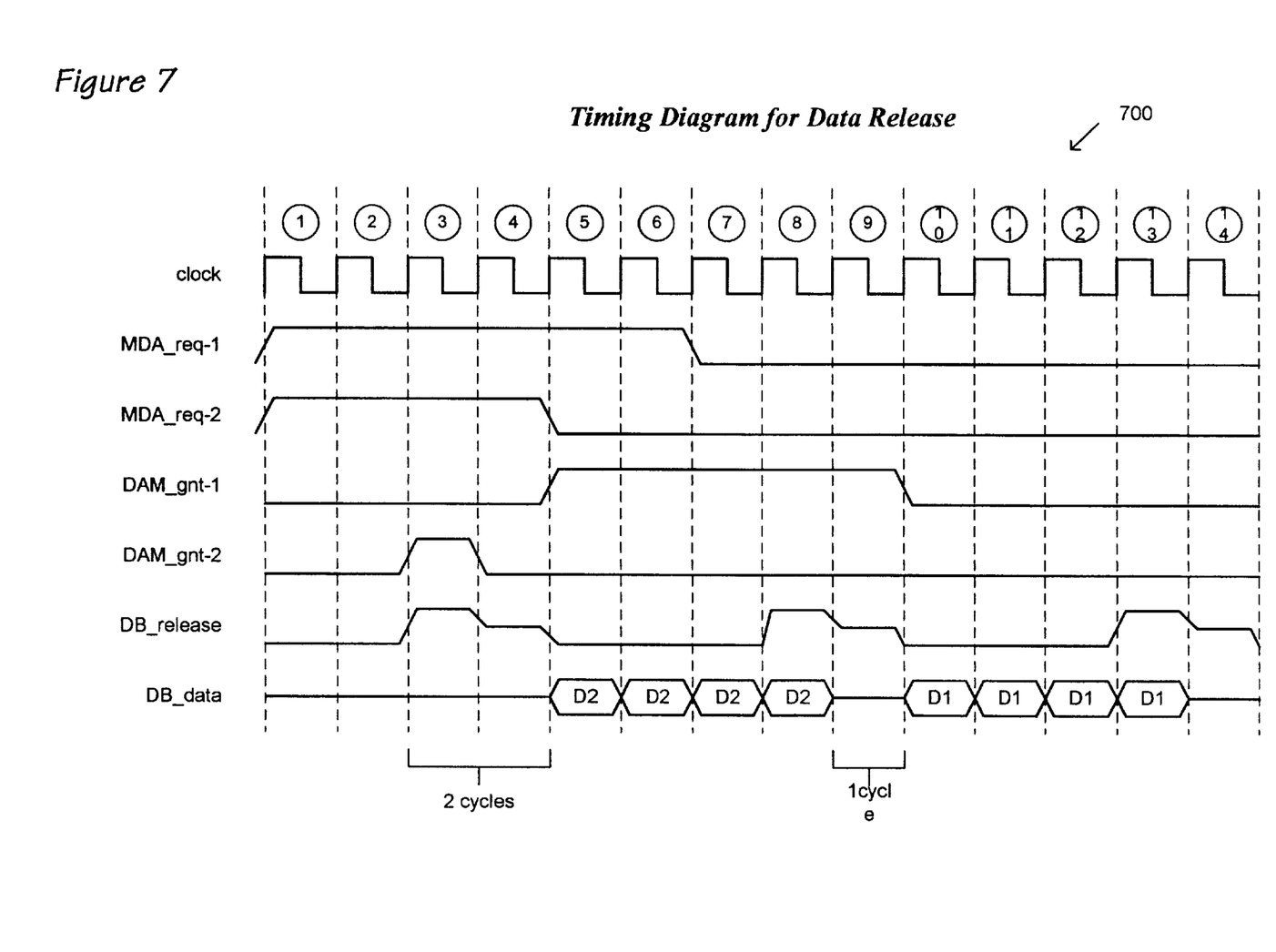
FIG. 7 is a timing diagram illustrating the data release mechanism of FIG. 6.

FIG. 7 provides a timing diagram 7 that illustrates arbitration on the data portion of the MOS bus using the data release drive and control logic 670 according to the present invention.

During clock cycle 1, data master 601 and data master 602 both request access to the data portion of the bus 610 by asserting MDA_req-1 and MDA_req-2, respectively. In one embodiment, there is a two-cycle latency between the time a master requests access to the data bus, and the time the bus arbiter 640 drives grant.

So, in clock cycle 3, the bus arbiter 640 grants access to data master 2 602 by driving DAM_gnt-2. In addition, the data release drive and control 670 of previous bus master drives DB_release in the same cycle. In one embodiment, there is a two-cycle latency between the time a master sees release, and the time it can drive the data bus. For example, even though DB_release is driven during clock 3, data master 2 602 does not "see" DB_release until clock cycle 4. Data master 2 602 then drives the data bus, after seeing DAM_gnt-2 and DB_release, at the beginning of clock cycle 5. Thus, from the time access to the data bus is granted to data master 2 602 (clock cycle 3), to the time it begins driving data (clock cycle 5), there is a two-cycle latency. In the present illustration, data master 2 602 drives data on the data portion of the bus 610 for 4 clock cycles (5–8).

In typical split transaction buses, it is common to hold grant with the current bus master, until it completes its bus transaction. However, because of the above described two-cycle latency, the present invention allows the bus arbiter 640 to remove grant from the second data master 602 before it completes its transaction, and to assert grant to the first data master 601. This is shown at clock cycle 5 where the bus arbiter 640 de-asserts DAM_gnt-2 and asserts DAM_1.

At this point, data master 2 602 is master of the data portion of the bus 610 for as many cycles as required (typically 2–16) to complete its current transaction. However, once it completes its current transaction, since DAM_gnt-2 has been de-asserted, data master 2 602 knows that it must relinquish control of the data portion of the bus 610. In addition, data master 1 601, upon seeing assertion of DAM_gnt-1 knows that it can begin driving data two-cycles after it sees DB_release. In one embodiment, the DB_release signal is driven by the Data Release Drive and Control logic 670 of the current bus master. Thus, if the bus arbiter 640 is the bus master, it is responsible for driving DB_release. If data master 2 602 is the current data master, it is responsible for driving DB_release.

The bus interface 604 of the current bus master (data master 2 602) knows that it will complete its data transaction during clock cycle 8. Therefore, by coupling the data release drive and control 670 to the bus interface 604, the data release 780 is also aware that data master 2 602 will complete its current data transaction during clock cycle 8. So, instead of waiting for data master 2 602 to complete its data transaction, the data release drive and control 670 of data master 2 602 asserts DB_release during clock cycle 8. That is, the data release drive and control 670 asserts DB_release during the last cycle of its data transaction.

So, during clock cycle 9, data master 1 601 sees DB_release. Since it has already been granted mastership of the data bus (beginning at clock cycle 5), it begins driving the data portion of the bus 610 during clock cycle 10. At this point it should be appreciated that although there is a 2-cycle latency between the time DB_release is driven, and the time data master 1 601 can begin driving the data portion of the bus 610, there is an effective latency between data transactions of only 1-cycle. This is because the data release drive and control 670 logic of the present invention allows a current bus master to drive DB_release during the last cycle of a transaction, rather than upon its completion.

The MOS bus protocol mandates that the data bus master assert the release signal on the last cycle of every data bus transaction, irrespective of whether the master has a grant signal or not from the arbiter. If the current master does not have the grant signal, this means that some other data bus master has the grant, and therefore asserting release on the last cycle of the transaction allows the other master to begin transmitting its data after a cycle gap, as discussed above.

If the current master has the grant signal, then it can simply ignore the fact that it asserted release and begin using the data bus again for another transaction on the very next cycle. When a data bus master asserts release, all other data bus masters latch this release signal for future reference. This latched release signal is reset as soon as the data bus is used again. For instance, in the example described above.

If a data bus does not have any further transactions, and it has a grant signal, it simply does nothing. Other masters that have latched the release signal do not reset it since the bus was not used. In essence, that current data bus master is parked on the bus, by virtue of the arbiter keeping the grant signal asserted to that master. During the time that it is parked, if it ever had to transmit data, it simply does so, without any delay. At this time, other masters must reset their release register. As before, the current master must assert release on the last cycle of its current transaction, and this release is latched again.

If the current master does not use the data bus again and grant is taken away and given to another master, this other master knows that the previous master has already asserted release (since this has been latched), and can therefore begin using the data bus 2 cycles later.

What has been illustrated in FIGS. 6 & 7 is a mechanism to reduce bus access latency between competing masters on a data bus.

MOS Bus Interface Signals

Figure 8A:
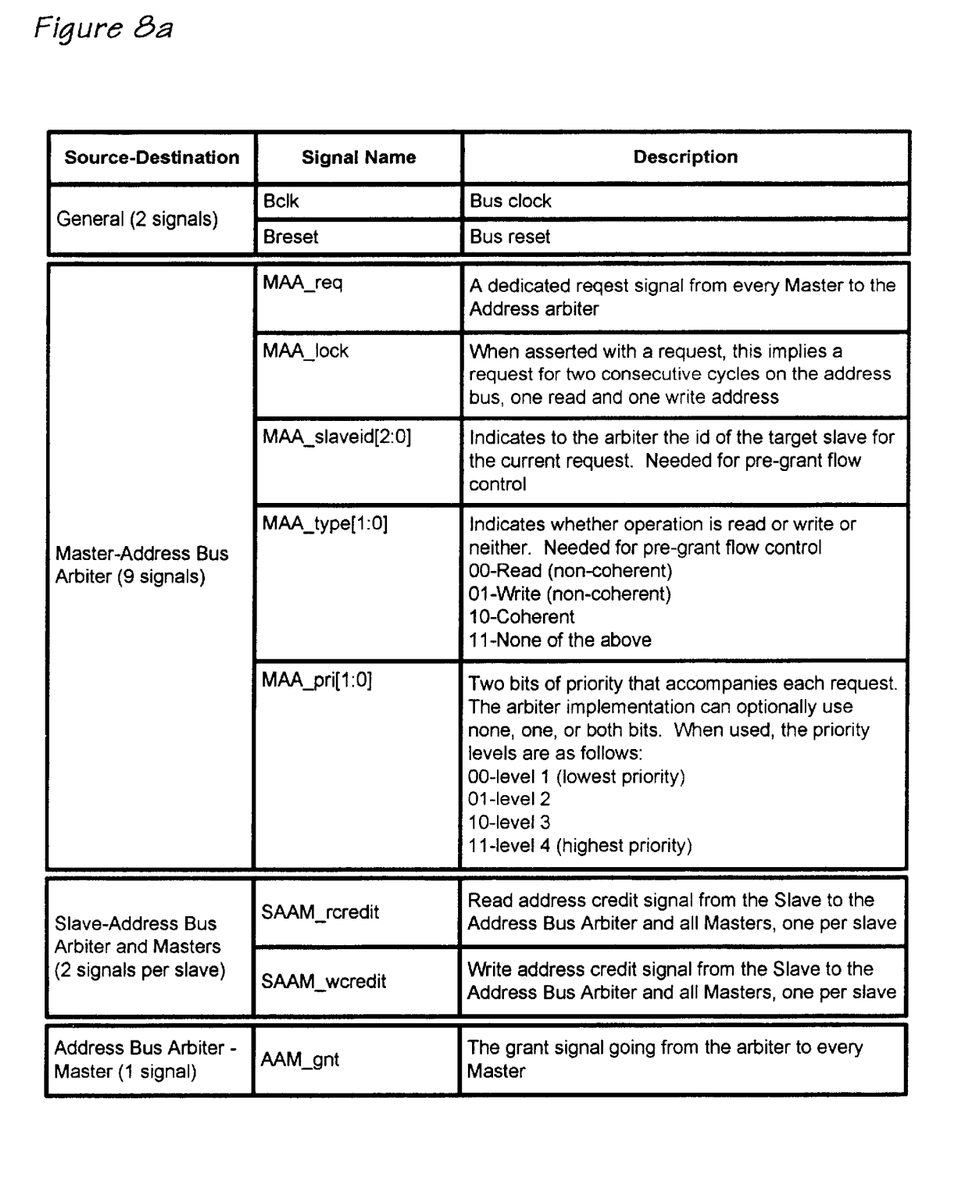
Figure 8C:
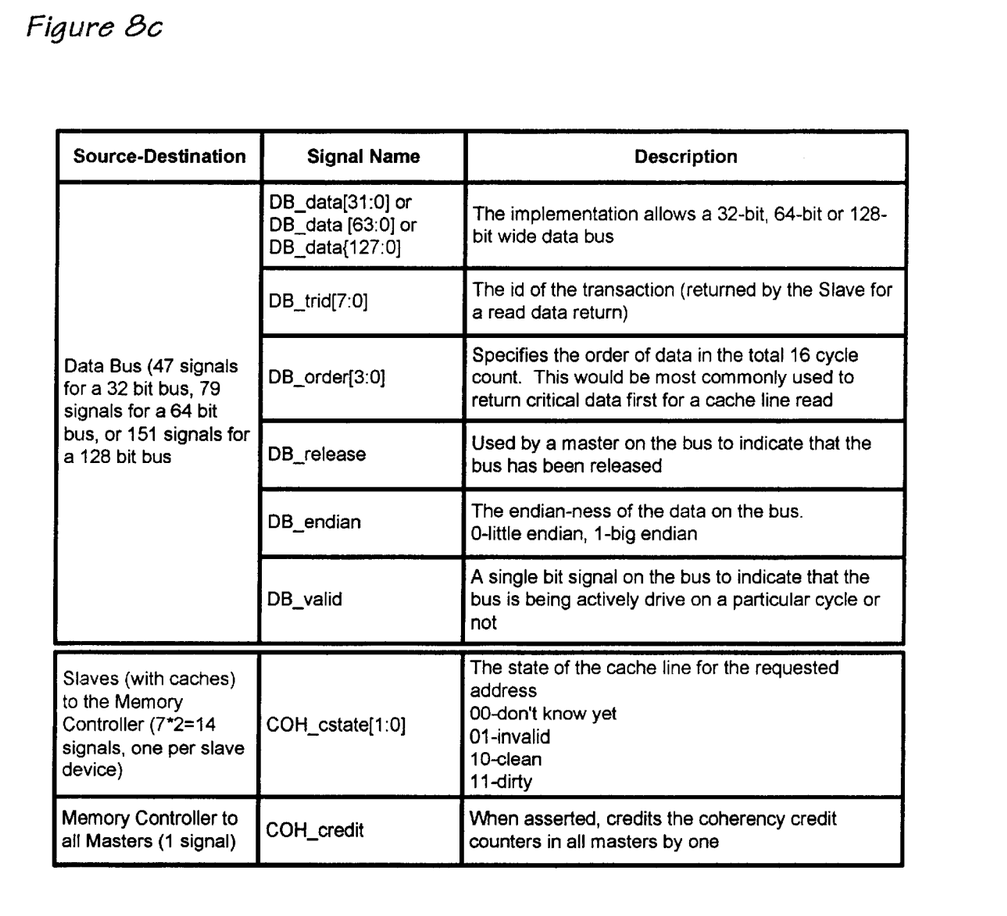

Referring to FIGS. 8a–c, a table 800 is shown that illustrates Address, Data and Control signals according to the MOS bus of the present invention. This Figure shows: 17 signal lines for address bus arbitration (plus 2 credit/debit signals per slave); 8 signal lines for data bus arbitration (plus additional signals for each master in a system); 52–65 address bus signals (depending on the size of the data bus); 47–151 signals for data bus signals (depending on the size of the data bus); and 3 signal lines for coherency.

The MOS bus interface 604 illustrated in table 800 is partitioned into three sub-interfaces, each of which operates independently from the others. The MOS bus interface 604 consists of separately controlled Address, Data and Coherence interfaces. The address and the data interfaces are independent, and each can be in either a master or slave state at any time regardless of the state of the other.

In address master state, the master drives the bi-directional address interface signals and is permitted to issue master requests to the MOS bus. In slave state, the master does not drive the bi-directional address interface signals and accepts external requests from the MOS bus.

In data master state, the master drives the bi-directional data interface signals and is permitted to send write-back, store or response data to the MOS bus. In slave state, the master does not drive the bi-directional data interface signals and accepts data responses from the MOS bus.

The coherence interface does not have any bi-directional signals. It is always in master state and driven by the master.

Read Request Protocol

Having described the on-chip system bus for the present invention, and particular performance improving aspects of the bus interface, an example of a read operation will now be presented that illustrates the bus interface in operation. The flow of a typical read operation is:

1. The Master that wants to read, requests the address bus arbiter for the address bus. It signals the id of the target slave, a priority, and the type of operation, i.e., Read.
2. The arbiter issues a grant to the requesting Master. This grant is based on whether the Master has received its turn in the arbitration scheme per its priority level. On receiving grant, the Master can drop its request line, or keep it asserted if it has another request that it needs to make.
3. The Master puts the read address out on the address bus.
4. When the Slave is ready with the read data, it requests the data bus from the data bus arbiter along with a priority. It uses the same priority bits that it obtained from the master during the address transaction.
5. The data bus arbiter grants the data bus to the slave per the arbitration logic.
6. The Slave puts the first 8 bytes of data out on the data bus when it has seen Release and has grant.

Figure 9:
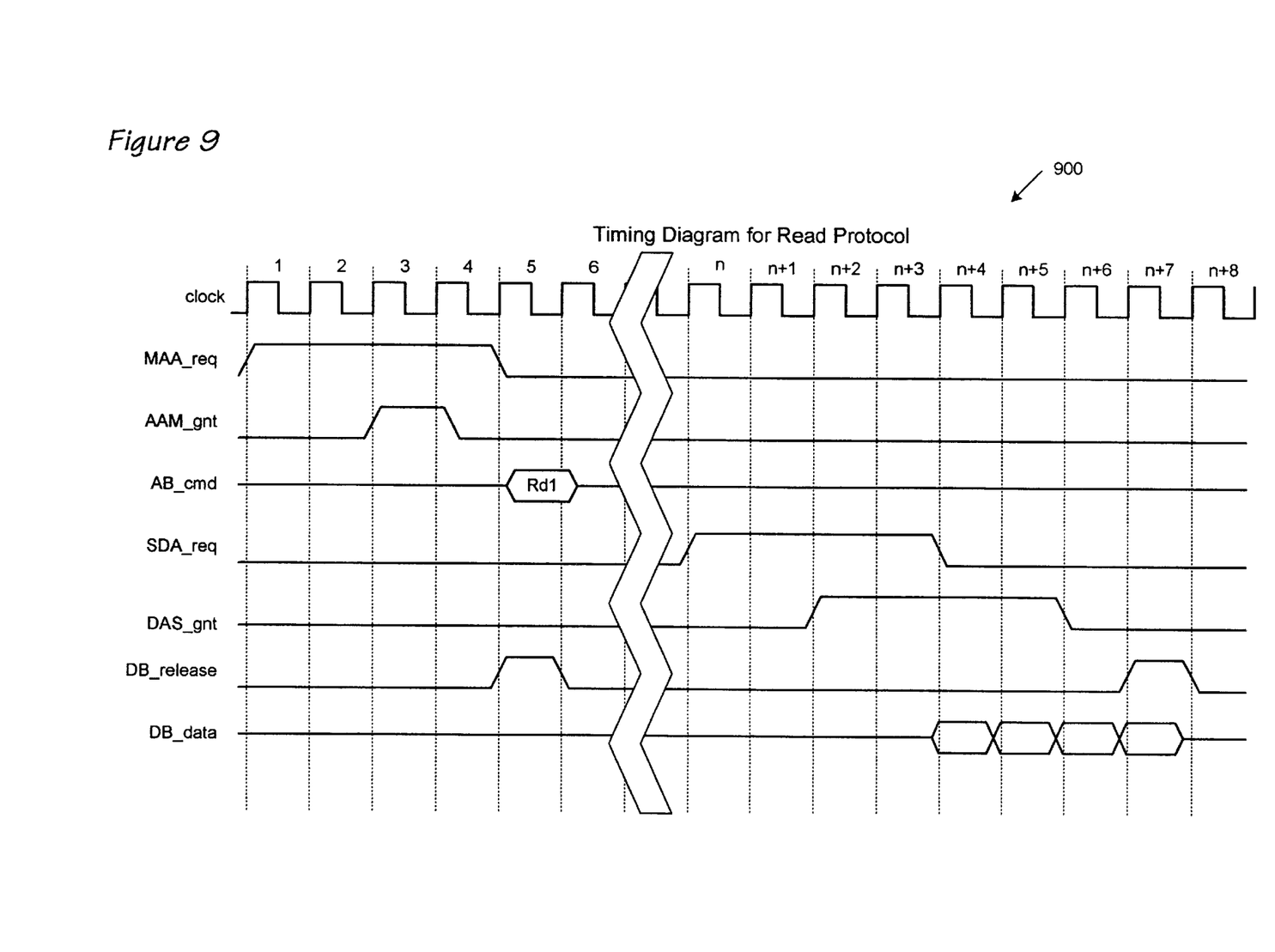
FIG. 9 is a timing diagram illustrating the read protocol of the split-transaction on-chip system bus with data release according to the present invention.

Referring to FIG. 9, a timing diagram 900 is presented illustrating the read protocol on the MOS bus. The control signals in FIG. 9 are presented as active HIGH. A read is shown to begin when a processor requests access to the address bus by asserting MAA_req at clock cycle 1.

At clock cycle 3, the arbiter grants the processor access to the address bus by asserting AAM_gnt.

At clock cycle 5 (2 clock cycles after seeing grant), the processor initiates a read by indicating a read command on AB_cmd. While not shown, it should be understood that the processor also presents the address of the read on the address lines of the MOS bus. Also shown at clock cycle 5 is the data release line DB_release. This indicates that another device that is responding to a previous request is completing the request and releasing the data bus. All masters of the data bus latch this release signal for future reference. In addition, the processor P0 becomes master of the address bus, and drives a read command Rd1 on the command lines. In addition, the processor P0 drives the address associated with Rd1 on the address lines of the MOS bus, and places the transaction ID associated with the request on SysCmdID.

At clock cycle n, the slave device, that is the target of the read, requests access to the data bus by asserting SDA_req.

At clock cycle n+2, the arbiter grants the slave access to the data bus by asserting DAS_gnt. Note, since the data bus is inactive when the slave requested access, grant is asserted two clock cycles after the request is made.

Since the data bus release signal was previously asserted and this signal was latched by the slave, and since the data bus was not used since the release was asserted, at clock cycle n+4, the slave device can begin driving data on the data bus. In this illustration, the slave device requires 4 clock cycles to fulfill the read request, and performs the request in a 4 cycle burst. In this instance the slave device was able to begin transferring data 2 cycles after seeing assertion of DAS_gnt since it had already recorded assertion of DB_release in clock cycle 5.

At clock cycle n+8, commensurate with the last clock cycle of data transfer, the slave device asserts DB_release indicating that it no longer requires access to the data bus.

MOS Bus Summary

Figure 10:
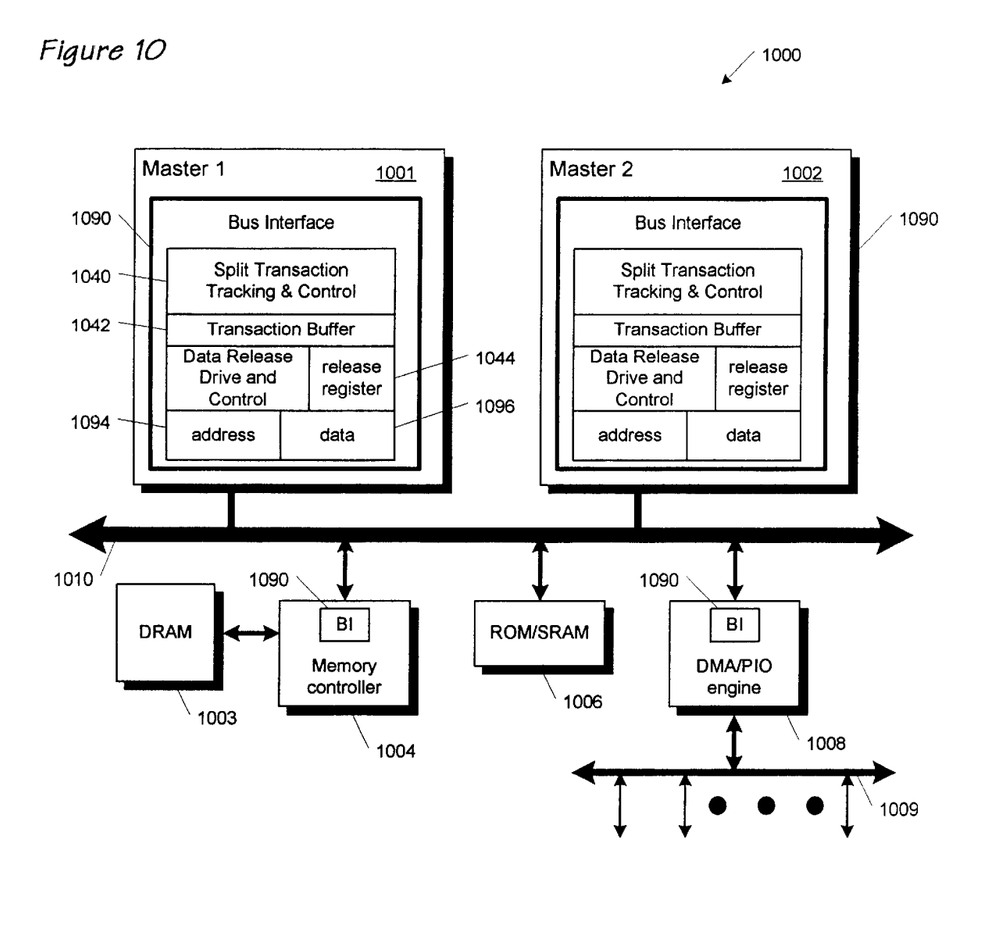
FIG. 10 is a block diagram illustrating data master devices designed to interface to the on-chip system bus of the present invention.

Referring now to FIG. 10, a block diagram 1000 is shown of processors 1001, 1002 that incorporate the novel bus features of the present invention. The processors 1001, 1002 are coupled to other devices 1004, 1006, and 1008 via a system bus 1010. While not explicitly shown, it should be appreciated that each of the devices on the system bus 1010 have a corresponding bus interface 1090 to allow them to communicate with other devices according to the protocol described above.

The processor 1001 has a bus interface 1190. The bus interface 1190 includes an address portion 1094 and a data portion 1096. Within (or coupled to) the bus interface 1090 are also a split transaction tracking and control 1040 having a transaction buffer 1042, and a release register 1044. Each of the elements shown in FIG. 10 operate as described above with reference to FIGS. 4–9.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer languages (RTL), Verilog HDL, VHDL, AHDL (Altera Hardware Description Language), or other programming and/or circuit (i.e., schematic) capture tools available in the art. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention using a combination of hardware and software are also possible. Therefore, the embodiments expressed above are within the scope of the invention and should also be considered protected by this patent.

In addition, elements of the MOS bus of the present invention have been described both separately, and together. These include: split-transactions, transaction ID's, data release, etc. Applicants anticipate that these novel features may be combined in a variety of ways, depending on the needs of the computing environment into which the MOS bus will be used.

Furthermore, the bus of the present invention has been particularly described with reference to a master processor and a slave. However, one skilled in the art will appreciate that any type of device, whether slave or master (or both slave and master), that requires on-chip access to other devices, may be designed to incorporate the novel features of the present invention by providing an interface to the MOS bus as described above.

Finally, the data release mechanism is particularly described with reference to the data bus. However, one skilled in the art should appreciate that in environments where the number of cycles provided to an address bus master is indeterminate, a similar release mechanism to that described above may be used.

The bus of the present invention has been particularly described with reference to an on-chip bus. One skilled in the art should appreciate however, that the novel aspects of the bus, as described above, may be implemented either partially, or entirely off chip, without departing from the solution provided by the present invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An on-chip system bus having a bus arbiter, and a plurality of data master devices that perform data transfers, wherein the data transfers have a cycle length that are indeterminate by the bus arbiter, each of the master devices comprising:

a bus interface, for allowing its associated master device to communicate on the system bus; and data release drive and control, coupled to said bus interface, for receiving a data bus grant signal from the bus arbiter, and for generating a data release signal to the system bus during the last cycle of the data transfers.

2. The on-chip system bus, as recited in claim 1 wherein the on-chip system bus is a split-transaction bus.

3. The on-chip system bus, as recited in claim 1 wherein a data master device is a device capable of initiating a data transfer on the system bus.

4. The on-chip system bus, as recited in claim 1 wherein the bus arbiter is configured to arbitrate between the plurality of data master devices for access to the system bus.

5. The on-chip system bus, as recited in claim 1 wherein the data transfers are in response to a read command occurring on the system bus.

6. The on-chip system bus, as recited in claim 1 wherein said bus interface comprises an address portion and a data portion.

7. The on-chip system bus, as recited in claim 1 wherein said data release drive and control monitors the system bus for said data bus grant signal after its associated data master requests access to the data bus.

8. The on-chip system bus, as recited in claim 1 wherein said data bus grant signal indicates to said data release drive and control that its associated data master will be master of a data portion of the system bus when said data release signal appears on the system bus.

9. The on-chip system bus, as recited in claim 1 wherein said data release signal is a signal driven by a current data bus master, to indicate to a pending data bus master that it can begin driving data.

10. The on-chip system bus, as recited in claim 9 wherein said current data bus master is a master device that is currently driving data on the system bus.

11. The on-chip system bus, as recited in claim 9 wherein said current data bus master, after driving said data release signal, can begin re-using the data bus.

12. The on-chip system bus, as recited in claim 1 wherein use of said data release drive and control within said bus interface of the plurality of data master devices reduces delay (or latency) on a data portion of the system bus between the plurality of data master devices.

13. A processing device configured to access an on-chip bus to perform a data transfer, the access initiated when the processing device generates a data bus request signal to a bus arbiter, wherein the data transfer has a cycle length that is indeterminate by the bus arbiter, the processing device comprising:

a bus interface, for coupling the processing device to the on-chip bus; and data release drive and control logic, coupled to said bus interface, for presenting a data release signal to the on-chip bus during the last cycle of the data transfer.

14. The processing device as recited in claim 13 wherein the processing device comprises any device that can respond to a data request.

15. The processing device as recited in claim 13 wherein the processing device comprises a device that performs the data transfer on the on-chip bus.

16. The processing device as recited in claim 13 wherein, upon receipt of the data bus request signal, the bus arbiter generates a data bus grant signal to the processing device, if a data portion of the on-chip bus is available.

17. The processing device as recited in claim 16 wherein the bus arbiter also generates a data bus grant signal to the processing device, if a data portion of the on-chip bus is not available, but will become available when released by a current data bus master.

18. The processing device as recited in claim 17 wherein said current data bus master is a master currently transferring data on said data portion of the on-chip bus.

19. The processing device as recited in claim 13 wherein said data release drive and control logic monitors the on-chip bus to determine when a second processing device presents a data release signal.

20. The processing device as recited in claim 19 wherein when said data release drive and control logic determines that a second processing device has presented a data release signal, said bus interface performs the data transfer if the processing device has previously received a data bus grant signal.

21. The processing device as recited in claim 13 wherein further comprising:

split transaction tracking and control, coupled to said bus interface, for establishing transaction ID's for transactions to be presented on the on-chip bus, wherein said transactions have split address and data portions.

22. The processing device as recited in claim 21 wherein said split transaction tracking and control comprises:

a transaction tag buffer, for temporarily storing said transaction ID's so that they may be presented along with said transactions on the on-chip bus.

23. The processing device as recited in claim 21 wherein said transaction ID's comprise:

a device ID, for identifying a device that initiates one of said transactions; and a transaction tag, for identifying a particular one of said transactions.

24. A computer program product for use with a computing device, the computer program product comprising:

a computer usable medium having computer readable program code embodied in said medium for causing an on-chip computing bus to be developed, said computer readable program code comprising:

first computer readable program code for providing a bus interface, for coupling a processing device to the on-chip computing bus; and second computer readable program code for providing data release drive and control logic that is coupled to said bus interface, that presents a data release signal to the on-chip computing bus during the last cycle of a data transfer, wherein said data release drive and control logic monitors the on-chip computing bus for a data release signal driven by other on-chip processing devices.

25. The computer program product, as recited in claim 24 wherein the data release signal is monitored by other processing devices to determine whether they can drive data on the on-chip computing bus.

26. A method for granting access to a data bus within an on-chip multi-master environment, the method comprising:

when the data bus is being accessed by a first master device, providing a data bus grant signal to a second master device;

before the first master device relinquishes access to the data bus, driving a data bus release signal from the first master device to the second master device; and accessing the data bus by the second master device, after it receives the data bus release signal from the first master device;

wherein the data bus is accessed by the first master device for an indeterminate number of bus cycles.

27. The method as recited in claim 26 wherein the data bus grant signal is driven by a bus arbiter that is coupled to the data bus.

28. The method as recited in claim 26 wherein by providing the data bus grant signal to the second master device before the first master device relinquishes access to the data bus, latency between the first and second master devices accessing the data bus is reduced.

* * * * *